United States Patent [19]

McGrevy

[11] Patent Number: 6,045,742
[45] Date of Patent: Apr. 4, 2000

[54] METHOD FOR APPLYING A DIFFERENTIAL HEATING TO INJECTION NOZZLE

[75] Inventor: Alan N. McGrevy, Chino, Calif.

[73] Assignee: Caco Pacific Corporation, Covina, Calif.

[21] Appl. No.: 09/141,937

[22] Filed: Aug. 28, 1998

Related U.S. Application Data

[60] Division of application No. 08/831,530, Apr. 1, 1997, Pat. No. 5,820,900, which is a continuation-in-part of application No. 08/701,115, Aug. 21, 1996, abandoned.

[51] Int. Cl.[7] .................................................. B29C 45/20
[52] U.S. Cl. ...................................... 264/328.15; 425/549
[58] Field of Search ......................... 425/549; 264/328.15

[56] References Cited

U.S. PATENT DOCUMENTS

| | | | |
|---|---|---|---|
| 4,133,460 | 1/1979 | Jerpbak | 222/386 |
| 4,195,755 | 4/1980 | Slautterback et al. | |
| 4,304,544 | 12/1981 | Crandell | 425/549 |
| 4,576,567 | 3/1986 | Gellert | 425/549 |
| 4,635,851 | 1/1987 | Zecman . | |
| 4,777,348 | 10/1988 | Gellert | 219/421 |
| 4,875,845 | 10/1989 | Hara et al. | 425/143 |
| 4,882,469 | 11/1989 | Trakas | 219/421 |
| 4,892,474 | 1/1990 | Gellert | 425/549 |
| 4,917,594 | 4/1990 | Gellert et al. | 264/328.15 |
| 4,923,387 | 5/1990 | Gellert | 264/328.15 |
| 4,925,384 | 5/1990 | Männer | 425/564 |
| 5,015,170 | 5/1991 | Gellert | 425/549 |
| 5,052,100 | 10/1991 | Trakas | 29/611 |
| 5,061,174 | 10/1991 | Gellert | 425/549 |
| 5,118,279 | 6/1992 | Gellert | 425/547 |
| 5,118,280 | 6/1992 | Gellert | 425/549 |
| 5,136,141 | 8/1992 | Trakas | 219/421 |
| 5,148,594 | 9/1992 | Gellert | 29/611 |
| 5,180,594 | 1/1993 | Trakas | 425/547 |
| 5,220,154 | 6/1993 | Günther | 219/421 |
| 5,254,305 | 10/1993 | Fernandez et al. | 264/328.9 |
| 5,299,928 | 4/1994 | Gellert | 425/190 |
| 5,312,241 | 5/1994 | Günther | 425/549 |
| 5,312,242 | 5/1994 | Gellert | 425/549 |
| 5,316,468 | 5/1994 | Günther | 425/549 |
| 5,318,434 | 6/1994 | Gellert | 425/549 |
| 5,324,191 | 6/1994 | Schmidt | 425/549 |
| 5,326,251 | 7/1994 | Gellert | 425/549 |
| 5,346,388 | 9/1994 | Gellert | 425/549 |
| 5,352,109 | 10/1994 | Benenati | 425/192 R |

(List continued on next page.)

FOREIGN PATENT DOCUMENTS

| | | |
|---|---|---|
| 0338664 | 10/1989 | European Pat. Off. . |
| 044748A1 | 2/1991 | European Pat. Off. ........ B29C 45/20 |
| 4445744C1 | 3/1996 | Germany . |
| WO9523680 | 9/1995 | WIPO . |

OTHER PUBLICATIONS

Patent Abstracts of Japan, vol. 11, No. 25, Jan. 23, 1987 (2 pages), 61–197,216.

*Primary Examiner*—Jill L. Heitbrink
*Attorney, Agent, or Firm*—Sheldon & Mak; Denton L. Anderson

[57] ABSTRACT

This invention provides an improved heating apparatus for controlling the temperatures of the resin melt that is pressure fed to a molding cavity comprising a heating jacket 30 comprising the concentric tubular elements; a copper sheath 32 having an inside surface 34 and an outer surface 36, a retainer sleeve 40 and coiled heating element 42 sandwiched between the sheath 32 and the retainer sleeve 40. The inside surface of the sheath 32 is formed with at least one circumferential groove 38 which provides an insulating air gap so that a lesser amount of heat is conducted to the central portion of the heating jacket 30 thereby creating three distinct temperature zones. The sheath 32 is provided with a channel 46 extending longitudinally down its inside surface 36 between the heating coil 42 and the outside surface of the housing 22 for the hot runner conduit 24. A thermocouple sensor cable 52 is received in the channel so that the thermocouple sensor 50 is strategically positioned adjacent the gate well section 28 to maintain the temperature of the resin melt entering the cavity.

4 Claims, 2 Drawing Sheets

U.S. PATENT DOCUMENTS

| | | | |
|---|---|---|---|
| 5,360,333 | 11/1994 | Schmidt | 425/549 |
| 5,456,592 | 10/1995 | Shindo | 425/549 |
| 5,470,219 | 11/1995 | Yokoyama et al. | 425/144 |
| 5,513,976 | 5/1996 | McGrevy | 425/549 |
| 5,558,888 | 9/1996 | Beck | 425/549 |
| 5,569,475 | 10/1996 | Adas et al. | 425/549 |
| 5,879,727 | 3/1999 | Puri | 264/328.15 |

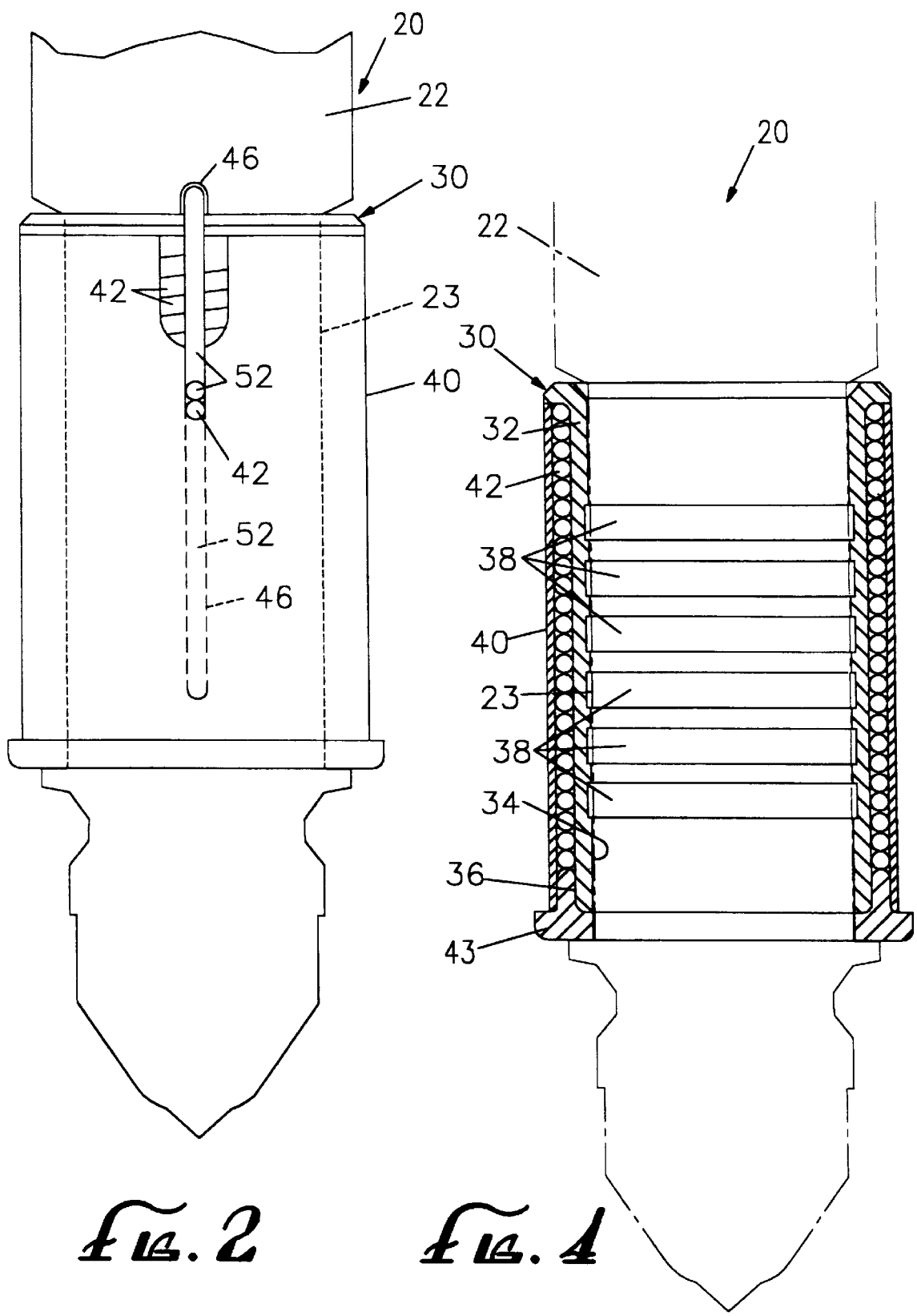

METHOD FOR APPLYING A DIFFERENTIAL HEATING TO INJECTION NOZZLE

This application is a Division of Ser. No. 08/831,530 filed Apr. 1, 1997, now U.S. Pat. No. 5,820,900, which is a Continuation-in-Part of application Ser. No. 08/701,115, filed Aug. 21, 1996, now abandoned.

This invention relates generally to the heating elements employed in injection molding apparatus to control the temperature of resin melt in a flowable condition for pressurized injection into mold cavities and more particularly for controlling the pattern of the heat profile applied to the molten resin.

BACKGROUND

One of the critical equipment functions in the well-known process of pressure injection molding of plastic parts is the control of the temperature of the flowable heated resins that are forced under pressure into mold cavities. As is well known in the art the flowable or molten resins are directed into the mold plates by injection nozzles that pressure feed the resin through the runners that feed into multiple mold cavities. The injection nozzles are required to be associated with a supply of heat in order to assure that flowable properties of the resin melt are at optimum conditions. Maintaining proper temperatures of the resin melt is one aspect of the process that determines the quality of the final molded product or component. Numerous techniques are employed to apply heat to the injection nozzle but the most notable is the coiled heating cable that envelops or surrounds the nozzle and conducts the heat to the resin as it courses or flows through the runner. The coiled heating cables are known to have a defined life expectancy which will depend in part on the manufacture but also is a function of how they are used in the environment of the injection molding process.

It will be appreciated that any improvement in the manner in which the heating coils are utilized in the environment of injection molding apparatus that prolongs the life expectancy of the elements contributes to the efficiency of the apparatus. Efficiency is achieved by less frequent shutdowns to replace burned-out heaters. Further, it has been found that optimal heat utilization, that is directing heat where it is needed, tends to prolong the heater life. The quality of the components produced by injection molding benefits from optimal temperature control because it avoids burning or overheating the resin by excessive heat. In the circumstance that demands are made on the heat system to output unneeded energy to portions of the resin, it tends to overheat the coils. Experienced technicians in this field also understand that overheating is deleterious to the resin as well. An overheated resin will undoubtedly result in a defective molded part.

Optimization of the amount of heat applied to the stream of resin melt going through the injection nozzle requires that it be patterned in terms of providing greater or lesser amounts of heat at certain zones along its path from the manifold to the cavity. Better heater designs create zones that apply different levels of heat transfer from the heating elements. For example, a non-linear heat profile can require varying the energy input anywhere from 20 percent to 40 percent between zones.

The conductivity of the heat energy generated by the heating elements extends axially along the injection nozzle and will encounter different masses of material through which the heat must be conducted before it reaches the molten resins. The point at which the molten resin enters the runner is contained in a rather large mass of metal, the central portion of the injection nozzle in the second zone requires lesser amounts of heat input attributable to the injection molding process itself and the tip or the last heat zone of the injection nozzle requires yet a different heat level requiring larger conductivity because of the thickness of the surrounding apparatus and readying the resin melt for entry into the cavity. Maintaining the desired heat input to the various zones, unless properly profiled, could result in much more heat delivered to the central zone posing a hazard both to the heating coil and to the resin itself. Such differential demand from heat energy, unless it is controlled, causes the heating element adjacent to the central portion to overheat for the reason that the energy is not being consumed. Reducing the heat input so that the central zone does not overheat reduces the heat to the entire system. Too low a heat level may reduce the desired temperature of the resin that is entering the cavity as it leaves the injection nozzle.

As the life of a heating element runs its course, replacement necessitates shutting down the injection molding apparatus; taking it apart to get at the heating element. The less complicated the heating assembly the more easily it can be disassembled and quickly replaced. This represents a significant economic advantage.

There have been attempts in this art at controlling the heat profile of the heating assembly for injection nozzles but they are not without disadvantages. Worthy of comment is the disclosure in U.S. Pat. No. 4,892,474 which employs a pair of flat-faced copper plates which are formed with internally integrated heating elements. These heating plates are bolted to opposite sides of the injection nozzle. These plates are equipped with channels that form insulating air spaces that only partially reach the surfaces of the injection nozzle. This known heating assembly has the disadvantage of providing only partial air insulating areas at the surface of the injection nozzle so the heat profile is discontinuous at best as is the heat which is applied to the injection nozzle where there is no air gap. It will be understood from this prior art teaching that portions of the injection nozzle are devoid of heat input or insulating air gaps.

Another problem is the fact that the heating elements are buried within the plates so that it behaves as a solid heating element on select portions of the injection nozzle leaving large areas of the surface of the nozzle unheated. Replacement of such heating plates is quite costly requiring discarding the entire heating unit and fully replacing it.

It has been found that proper control of the amount of heat energy applied to the resin melt is critical with respect to the quality of the component that is molded and the prolongation of the life of the heating elements. The ease and simplicity and less frequent replacement of numerous spent heating elements during the course of the year significantly affects the productivity and the economics of the injection molding apparatus.

SUMMARY

In accordance with the teachings of the present invention there is provided a heating apparatus for heating a resin melt as it passes through an injection nozzle which is fixtured into the mold plates and fed molten resin from a manifold system. The heating apparatus comprises of an injector nozzle body having an outer wall and a longitudinal extending channel for receiving molten resin under pressure. The molten resin is directed to a mold cavity through an injector tip. There is provided a heating device assembly for receiving said nozzle body comprising a continuous coiled heating element wrapped around the injection nozzle forming a circumferentially extending heating coil that axially runs the extent of the injection nozzle housing and includes a heat conductive sheath interposed between the heating coil elements and an outer wall surface of the injector nozzle body. The heat conductive sheath has an inside surface and an outer sheath surface, with the outer surface being in heat conductive or heat transfer contact with the coiled heating elements and the inside surface having at least one circumferential groove formed therein normal to the longitudinal axis of the injection body forming an air space between the inside sheath surface and the injector nozzle body. The heating coil is sandwiched between the heat conductive sheath and an outer retainer sleeve element that is coextensive with the coil and the sheath.

Another feature of the apparatus of this invention is the means for optimally controlling the heat input to the resin melt comprising a heat sensor thermocouple located adjacent to the exit point of the melt stream prior to being pressurized into the cavity for monitoring the heat content of the resin entering the mold cavity.

The heating device assembly of this invention does not require an additional clamping unit to hold the assembly in operating condition with the injection mold apparatus.

DRAWINGS

These and other features, aspects and advantages of the present invention will become better understood from the following description, appended claims, and accompanying drawings where:

FIG. 2 is an enlarged front elevation view of the heating device assembly, partially cut-away showing the continuous wrap-around of the heater coils and the circumferentially formed grooves that provide the heat profile;

FIG. 4 is a front elevation cross-section of the heating device assembly of FIG. 3 taken along section 4—4 showing the continuous heating coil wrap-around contained between the heat-conductive sheath and the retainer sleeve;

These and other features, aspects and advantages of the present invention will become better understood from the following description, appended claims, and accompanying drawings where:

DESCRIPTION

Figure 1:
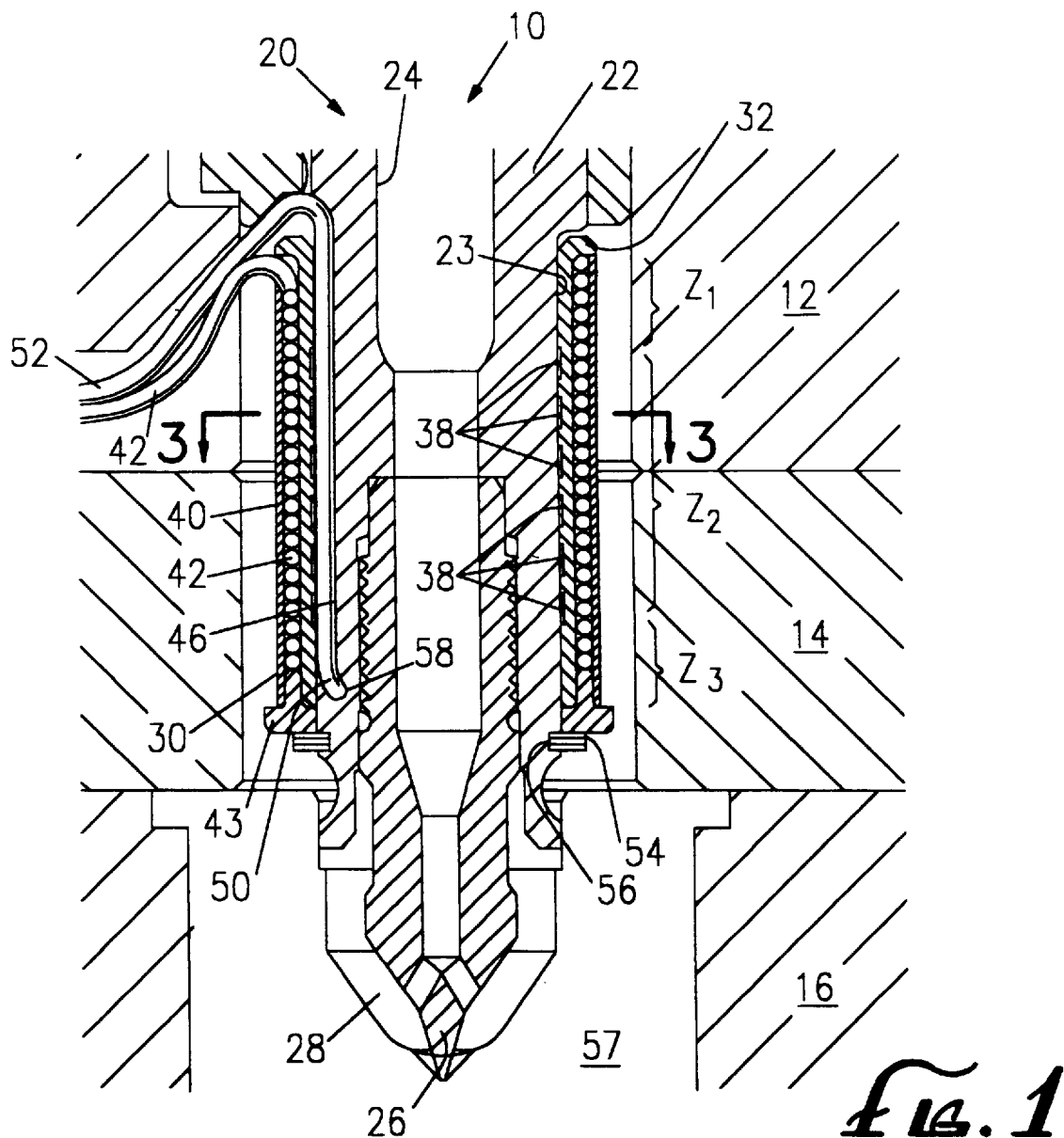
FIG. 1 is an enlarged fragmentary front sectional view of an injection nozzle body fixtured in the molding plate and molding plate cavity showing the heating assembly enveloping the nozzle body.

As shown in the drawings for purposes of illustration the present invention is embodied in an injection mold which employs an injection nozzle that directs the resin melt into a mold cavity producing a molded component. The injection nozzle includes a hot runner conduit through which flows the plastic or resin melt that must be heated in order to precisely control its temperature and thereby its flowability. The control of the temperature is essential to the injection molded process. As will be appreciated from the following detailed description, proper temperature control is important to preserve stability of the molten resin as well as prolongation of the life of the heating unit associated with the injection nozzle. FIG. 1 illustrates a section of an injection mold identified generally with the numeral 10. The basic structure of the injection mold comprises of a manifold plate section 12, a cavity retainer plate 14 and a cavity plate 16 and a cavity 57. Within the basic structure there is disposed the resin melt feed system (not shown) that feeds the moldable material into the injection nozzle identified generally with the numeral 20.

Central to the construction of the injection nozzle 20 is a housing 22 which contains the hot runner conduit 24 through which flows the resin melt supplied from the feed manifold (not shown). The hot runner conduit 24 extends axially within the full length of the housing 22 reaching the nozzle tip 26. The injection nozzle is received within the manifold plate 12 which is precisely aligned with the mold cavity retainer plate 14. The nozzle tip 26, which is at the extremity of the hot runner conduit 24, which is an extension of nozzle housing 22. The nozzle tip section 26 is received in the cavity 57 of the mold. The precision alignment of the plates 12, 14, and 16 ensures proper feed of the resin melt into the cavity from the hot gate well area 28 that guides and directs the nozzle tip 26 into the cavity proper (not shown).

Figure 3:
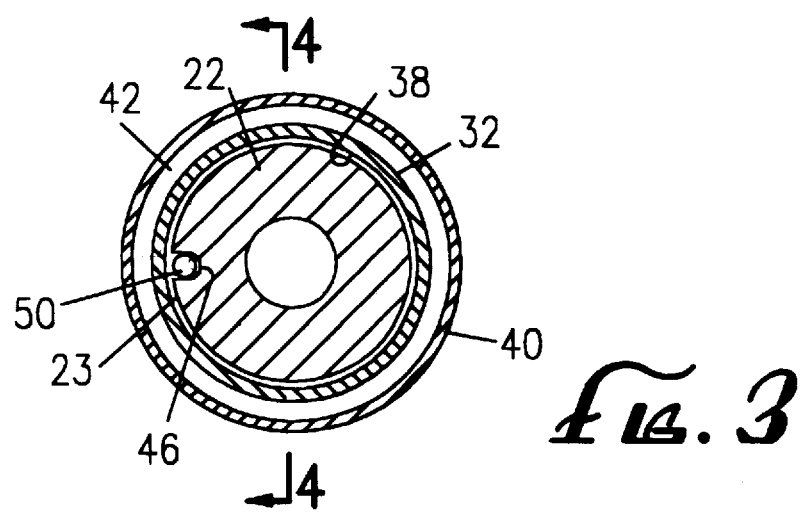
FIG. 3 is a top view of the heating device of FIG. 1 taken along section 3—3.

Referring now to FIGS. 1, 2 and 3 there is shown the heat device identified generally with the numeral 30 which is formed of three concentrically arranged elements. The sheath cylinder 32, the innermost element, serves as a sheath and has an inside surface 34 and an outer surface 36 and it sheaths the hot runner housing 22 so that the inside surface 34 is in intimate contact with the housing 22. The sheath 32 is preferably made of copper. However, any material such as brass, beryllium, copper or aluminum may be used provided it has a high thermal conductivity. It will be noted that the inside surface 34 of the sheath 32 has a series of lateral grooves or vacuities 38 that extend circumferentially around the cylinder wall and they extend longitudinally along the inside surface. The function and operation of the grooves 38 and the sheath 32 will be discussed in further detail hereinafter. An outermost retainer sleeve 40 made of steel serves as a retainer for the heating device 30 retaining the three concentrically arranged elements physically in place about the injection nozzle 20 and functions to direct the heat toward the hot runner conduit 24 and at the same time shielding the rest of the molding apparatus from needlessly drawing off the heat.

Sandwiched between the sheath 32 and the retaining cylinder 40 there is disposed a continuous coil winding of heating elements 42 that form an uninterrupted pattern of heat to the sheath 32. The temperature supplied by a power source (not shown) can range from room temperature to 1000° F. which provides the thermal force creating the heat profile applied to the hot runner conduit 24.

Referring now to FIG. 3, there is illustrated lateral circumferential grooves 38 formed on the inside surface 34 of the sheath 32. The purpose of the grooves 38 is to provide spaces or vacuities at strategic locations along the inside surface 34 which serve as heat insulating zones between the heat conductive zones of the inside surface 34 that contact the outer surface of the housing 22.

To better appreciate the advancement that the heat-conductive assembly of this invention brings to the injection molding art, it is necessary to understand the optimum heat pattern that needs to be applied to the melt resin as it courses through the hot runner conduit 24 and the collateral advantage of increasing the longevity of the heating coil which contributes to the efficiency of servicing the heat molding apparatus. Not all sections of the path taken by the resin melt through the hot runner require the same amount of heat. Referring to FIG. 1, the path of the resin melt between the manifold entering the hot runner conduit 24 and the lower end of the heat jacket assembly 30 is divided into three heating zones. Zone 1 represents the entry zone into the hot runner conduit, the central zone 2 and the third heating zone 3 where the resin melt exits the hot runner conduit and enters the gate well 28. As the molten resin enters the hot runner conduit 24 more heat is required in zone 1 because some amount of heat is conducted through a greater mass of metal comprising the manifold plate 12 before it reaches the resin. At the central portion zone 2 of the hot runner, the resin melt requires less heat for two reasons: first, it has received an initial burst of heat in zone 1 and second, it experiences halting movement within the hot runner during the time the mold cavity is emptied of its molded component before it is ready for the next fill. Depending on the mold cycle time for each component and how fast the mold can be emptied and readied for the next fill, a quantity of resin melt momentarily becomes stationary within the hot runner and less heat is required and, if not reduced, there is a heat buildup. Buildup of heat at the central zone 2 in prior known systems has been known to adversely affect the resin and also known to overheat the coils which decrease the functional life of the heater. The heating device of this invention remedies this problem as described hereinafter in connection with FIGS. 1 and 4.

As the resin melt approaches the nozzle tip 26, exiting the portion of the injection nozzle from zone 3, it requires more heat in order to conduct the energy through a greater mass of metal that is present surrounding the housing 22 and also to assure that its temperature does not fall below the desired level as it enters the nozzle tip 26. Understandably its heat level is important for the reason that the resin within the gate well 28 is no longer subject to the heat conductive reach of the heating device 30.

Referring to FIGS. 2 and 3, the presence of the air gaps 38 and the central zone 2 provide the desired level of insulation reducing the level of conductivity to the resin. It will be understood that the size of each air gap 38 and the number of such gaps in any particular heating device will be a function of the particular molding apparatus, the kind of resin used to form the components and its flow properties as a function of the melt temperature as well as its sensitivity to overheating.

Referring now to FIG. 4, it illustrates another preferred embodiment of the invention for controlling the temperature of the resin melt. To complete the heating device the conductive sheath 32, the heating coil 42 is encased in the third retainer sleeve 40 that serves to direct the heat in the direction of the injection nozzle and also shields the rest of the molding apparatus from being heated in a manner that competes with what is required for the hot runner conduit 24. As shown in FIG. 4, the sheath 32 is split axially down its side to form a channel 46 for receiving a thermocouple sensor 50. The channel 46 provides an access passage through the heated device assembly 20 for locating and retaining the thermo couple in the strategic position. The sensor 50 is connected to a cable 52 that is contained in the channel 46 so that the sensor is juxtaposed the hot runner conduit 24 at a location that has been found to provide the appropriate temperature measurement that best represents the proper molding temperature condition of the resin melt. The arrangement of the split 46 in the sheath 32 which is encased in the retainer sleeve 40 form a heat-responsive structure that rigidly holds the thermocouple sensor 50 in place. The channel 46 and the heating coils 42 serve to provide a fix position for the cable 52 within the heating device 30. The thermocouple sensor 50 is received in a well 58 formed in the housing 22. While the axial split results in the formation of the channel 46 another alternative for providing a passageway for the thermocouple that can be employed for locating and retaining it in the strategic position is an axial groove that extends along the inside surface of the conductive sheath 32 without penetrating the outer surface 36.

Referring again to FIG. 1 the construction of the injection nozzle 20 provides a stop ring 54 affixed to the housing 22. The housing 22 has a circumferential groove 56 which receives the stop ring 54 which in turn serves as a footing for the heating device 30 and position on the housing 22. The heating device is precisely placed relative to the cavity-side mold 16. By virtue of the stop ring 54 the position of the heating device 30 is precisely aligned relative to the cavity side of the mold plate 16 and thereby locates the thermocouple sensor 50 in a strategic position inside the well 58 thereby providing the desired temperature control. The thermocouple cable 52 can be connected to well-known control devices (not shown) to control the energy supply to the heating coil 42 in accordance with preset temperature as it is monitored by the sensor 50.

In operation a supply of resin melt is fed into the hot runner conduit 24. As it enters zone 1 it receives a supply of heat energy maintaining its temperature at a level suitable through zone 1. In zone 2 the grooves or the insulating gaps 38 provide a lower amount of heat to the resin melt for the reasons that there is a lesser amount of metal through which the heat is to be conducted and for the reason the process is delayed during removal of the molded component from the cavity until it is ready for the next fill. This causes some heat buildup in the resin. The resin enters zone 3 where it is given another burst of heat different from either zone 1 and/or zone 2 in order to sustain its temperature level as it enters the unheated gate well 28 of the cavity so that it has the proper flow properties without overheating to fill the cavity.

Although the present invention has been described in considerable detail with reference to certain preferred versions thereof, other versions are possible. Therefore, the scope of the appended claims should not be limited to the description of the preferred versions contained herein.

What is claimed is:

1. A method for applying a differential pattern of heating zones to a resin material for injection into a mold cavity as it passes through an injection nozzle, said method comprising the steps of:

provided a conduit for feeding resin melt through an injection nozzle body along a feed path directed to a mold cavity;

wrapping the injection nozzle body with a continuous coil winding of heating elements;

distributing the heat from said coiled heating elements uniformly by interposing a heat conductive sheath between the coiled heating elements and the injector nozzle body;

forming a series of heat insulting circumferential grooves along the inside surface of the sheath that is in heat conductive contact with the injector nozzle body, said grooves extending generally normal to the feed path of the resin melt;

whereby a differential pattern of heating zones is applied to the resin melt.

2. The method as claimed in claim 1 wherein a heating zone midway along the feed conduit applies less heat to the resin than the adjoining zones.

3. A method for applying a differential pattern of heating zones to a resin material for injection into a mold cavity as the resin passes through an injection nozzle, said method comprising the steps of:

provided a feed conduit for feeding resin melt through an injection nozzle body directed to a mold cavity;

feeding a supply of resin melt to an injection nozzle body;

forming an uninterrupted winding of heating elements creating a uniform heat pattern about the nozzle body;

conducting the uniform heat pattern from said coiled heating elements by interposing a heat conductive cylindrical sheath between the coiled heating elements and the injection nozzle body;

providing a surface of the sheath against the injection nozzle body, said surface having formed therein a series of heat insulting circumferential grooves;

whereby a differential pattern of heating zones is applied to the resin melt.

4. The method as claimed in claim 3 including the step of forming said circumferential grooves so that the differential pattern is applied normal to the passage of the resin melt.

* * * * *